Figure 1:
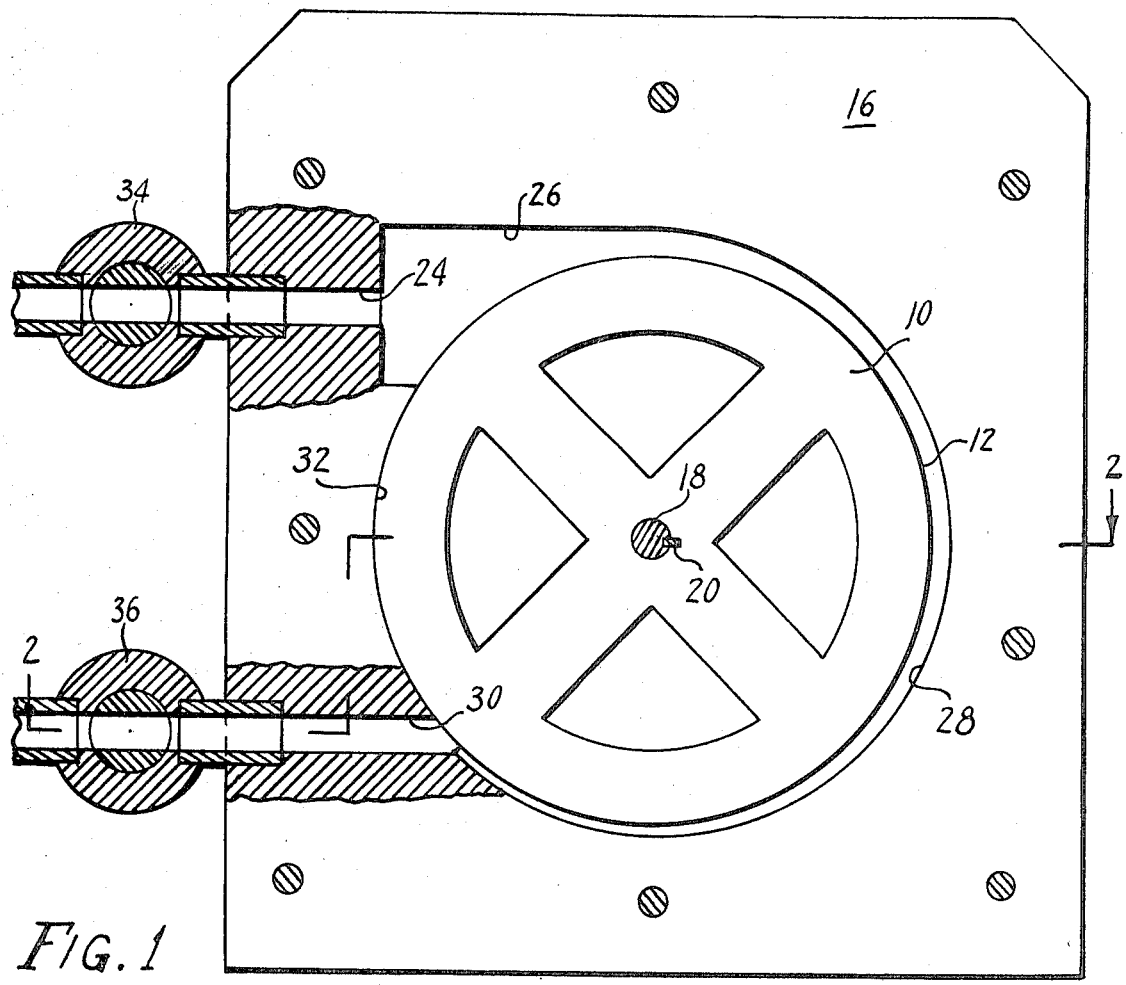

United States Patent
Shanahan

[15] 3,650,632
[45] Mar. 21, 1972

[54] FRICTION DRIVE ROTARY ENGINE

[72] Inventor: John L. Shanahan, 380 West Main St., Waterbury, Conn. 06702

[22] Filed: May 5, 1970

[21] Appl. No.: 34,696

[52] U.S. Cl. .................................. 415/90, 415/96, 416/4
[51] Int. Cl. ........................................................ F01d 1/36
[58] Field of Search ............................ 415/90, 96; 416/4

[56] References Cited

UNITED STATES PATENTS

| | | | |
|---|---|---|---|
| 1,031,834 | 7/1912 | Brazelle | 415/90 |
| 1,489,930 | 4/1924 | Clary | 415/90 |
| 713,461 | 11/1902 | Lennon et al. | 415/90 |
| 1,061,142 | 5/1913 | Tesla | 415/90 |
| 1,061,206 | 5/1913 | Tesla | 415/90 |
| 2,043,788 | 6/1936 | Adair | 415/90 |
| 3,037,457 | 6/1962 | Sternlight | 415/90 |

Primary Examiner—C. J. Husar
Attorney—Victor J. Evans & Co.

[57] ABSTRACT

A casing having a circular bore therein, a rotor rotatably mounted within the bore, inlet and exit vents leading to and from the bore, and valves connected to the vents outside the casing for regulating the passage of air or steam travelling from one vent to the other between the rotor and the inner diameter of the bore.

4 Claims, 2 Drawing Figures

Patented March 21, 1972

3,650,632

INVENTOR.
JOHN L. SHANAHAN
BY Victor J. Evans & Co.
ATTORNEYS.

FRICTION DRIVE ROTARY ENGINE

This invention relates to a machine which converts the energy of steam or compressed air into rotating mechanical motion. The essence of this invention is that it is based on the principle that gases flowing in a closed area exert friction against walls. Normally such friction is undesirable or ignored; however, this invention, which is neither a turbine nor a motor, puts this friction to maximum use.

A simple analogy to this invention is a rubber fabric or leather belt turning a pulley as the belt drags the surface of the pulley therewith entirely through friction. Great power can be transmitted in this manner, and V-belts having a 1 inch width can transmit up to 100 horsepower.

One of the unique features of this invention is that it, unlike the single stage turbine engine, does not rely on the velocity of the steam for rotating the rotor at a peripheral speed not far from the velocity of the steam. This is why prior single stage turbines were not practical because in order to turn in the same velocity range as the steam, the rotor would hardly be able to hold together and heavy expensive reducers would be needed which would nullify the advantages that a single stage have. Another problem with turbine engines which has been alleviated is that they do not have much torque or efficiency at low speeds. This invention, of course, as has already been explained, uses the pressure principle rather than the velocity principle due to the fact that this invention prevents air or steam from pouring out of the exit vent too easily. This slower movement of air or steam in this invention means more power at the lower speeds and greater conservation of the source of steam thereby increasing efficiency even more. Because of the gradually tapered steam chamber, this invention enables a head of steam to be kept throughout the chamber without an excessive volume of steam. This, of course, could not be done if the exit vent were open rather than being controlled by an exit valve.

Another problem with engines which has been alleviated in this invention is that rotors have been produced with grooves therein reducing the effective friction area rather than increasing it as this invention does without grooves on the rotor.

Accordingly, the primary object of this invention is to provide means for efficiently converting air or steam pressure into rotating mechanical motion.

Another object of this invention is to provide means for delivering an unexpected amount of power in view of the small weight of the device.

A further object of this invention is to provide an engine which will start out with a full load from a dead stop. It should be mentioned that the internal combustion engine does not do this which is the reason it must be disengaged through a clutch in order to start. The reciprocating steam engine of course does develop great starting torque but is more complicated than this invention.

It is also noted that turbines and internal combustion engines develop power only at considerable revolutions per minute.

A still further object of this invention is to provide an efficient engine having only one moving part.

Lastly, it is an object of this invention to provide means for reversing mechanical rotation of the rotor in a simple and efficient manner.

Figure 2:
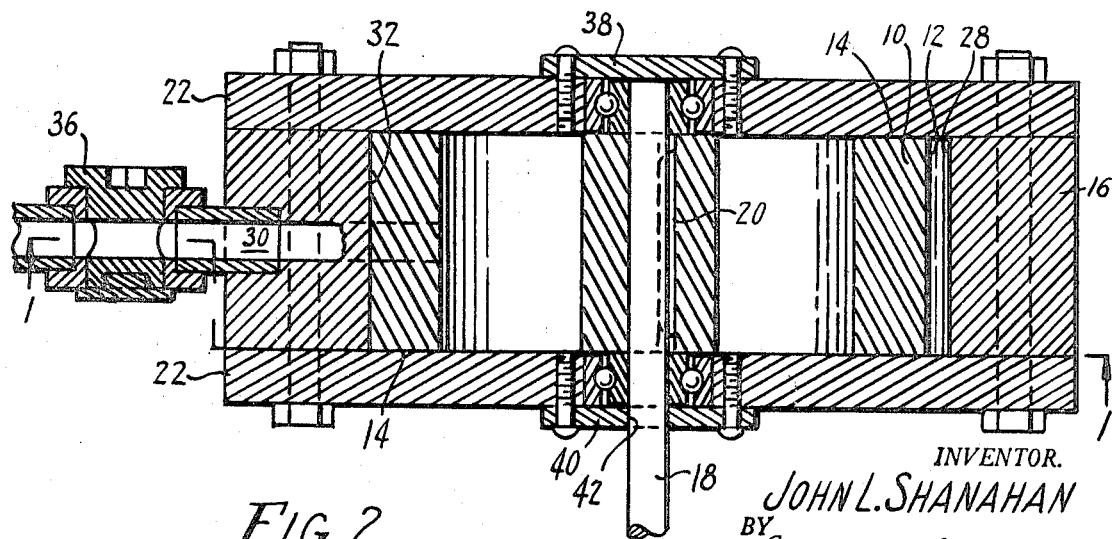

The above and other objects of this invention will become apparent to those skilled in the art after a consideration of the following detailed description of the preferred embodiments of this invention taken together with the accompanying drawing in which:

FIG. 1 is a cutaway elevational view of the device; and
FIG. 2 is a sectional view taken on line 2—2 of FIG. 1.

Referring to the drawing in detail, there is illustrated a simple rotor 10 having a circular perimeter 12. Rotor 10 may either be a solid piece of metal or ribbed, as shown, in any convenient way to lighten the weight thereof. Rotor 10 has parallel flat sides 14 for turning freely in the snug casing 16 in which rotor 10 is mounted by means of a shaft 18 to which rotor 10 is locked with a key 20. End plates 22 of casing 16 seal the engine to prevent leakage of air or steam, each plate 22 having an antifriction bearing for rotatably supporting shaft 18 at each side of rotor 10 allowing rotation thereof.

At the upper portion of casing 16 there is an inlet port 24 leading into an enlarged section 26 of a chamber 28 in which rotor 10 is mounted. At a lower portion of casing 16 is an exit port 30. It should be emphasized that the space between perimeter 12 and the contour of chamber 28 decreases from enlarged section 26 toward exit port 30, perimeter 12 of rotor 10 rotatably fitting against the portion 32 of chamber 28 between inlet and exit ports 24 and 30 in a manner so as to prevent the passage of air or steam therebetween. Inlet and exit valves 34 and 36 are mounted outside casing 16 and are connected to inlet and exit ports 24 and 30 respectively for regulating air or steam passage through chamber 28. Upper seal element 38 and lower seal element 40 are mounted over end plates 22 for minimizing air or steam leakage from chamber 28, lower seal element 40 having an aperture 42 through which shaft 18 projects.

Either air or steam may be used in actual operation. Assuming the use of steam, it will enter inlet port 24 under pressure and will fill the entire chamber 28 prior to leaving through exit port 30. If the space between chamber 28 and perimeter 12 was too great or exit port 30 was too big, then the steam would simply rush around rotor 10 and pass out of exit port 30 dissipating its energy in the outside air. If the spacing is small and exit port 30 is not large, steam fills the chamber under pressure because it cannot escape through exit port 30 fast enough to release its pressure. This steam pressure presses against the surface of rotor 10 at perimeter 12 in a direction along a path intersecting the center of rotor 10. This pressure against perimeter 12 supplies the grip or friction analogous to that produced between the surface of a driven pulley and its associated belt. Since the contour chamber 28 tapers so that there is a minimum space between the inside surface of chamber 28 and perimeter 12 at the opening of exit port 30, a slight amount of steam will be escaping causing steam to gradually move through chamber 28 from inlet port 24 while at the same time maintaining heavy pressure against the surface of rotor 10 at perimeter 12. The moving steam pressing against the surface of rotor 10 drags rotor 10 with it rotating it about shaft 18. As has already been mentioned, various types of rotors may be used. Some may be completely solid or ribbed and some may have smooth surfaces or roughened surfaces at perimeter 12 for varying results, regulation of the velocity and pressure of the steam and rotation of the rotor being made possible by control valves 34 and 36. It should also be pointed out that exit port 30 preferably may be adjustable for varying its diameter for variable loads, the exit diameter being precalculated for corresponding loads for efficient conversion of energy.

While the preferred embodiments of this invention have been illustrated and described, it will be understood by those skilled in the art that modifications and changes may be resorted to without departing from the spirit and scope of the invention.

I claim:

1. An engine, comprising a casing having a chamber therein, a shaft rotatably mounted in the casing near the center of said chamber, the longitudinal axis of said shaft coinciding with the longitudinal axis of said chamber, one end of said shaft projecting out of said casing, a cylindrical rotor mounted at the center thereof about said shaft, said casing having an inlet port between the outside of said casing and one end of said chamber, said casing having an exit port between the outside of said casing and another end of said chamber, the longitudinal axes of said inlet and exit ports being transverse with longitudinal axis of said shaft, the contour of said chamber tapering from said inlet port to said exit port in a manner so that the space between the cylindrical surface of said rotor and the wall of said chamber gradually decreases from said inlet port toward said exit port, and a valve connected to each said port for regulating the flow of fluid in and out of said chamber, said chamber causing the fluid to exert a pressure along the cylindrical surface of said rotor in a direction along a path intersecting with the center longitudinal axis of said rotor, causing the fluid to move at a slow velocity through said chamber, and causing the fluid to exert a friction grip along the cylindrical surface of said rotor causing said rotor and said shaft to rotate and move at a velocity in proximity to that of the speed of travel of the fluid through the chamber.

2. The engine of claim 1, wherein the space between said one end of said chamber and the cylindrical surface of said rotor is larger than the diameter of said inlet port and wherein the space between said other end of said chamber and the cylindrical surface of said rotor is substantially less than the diameter of said exit port for producing said friction grip and obviating a substantial volume of steam as well as transmission apparatus.

3. The engine of claim 1, wherein the cylindrical surface of said rotor is completely smooth.

4. The engine of claim 1, wherein the cylindrical surface of said rotor is roughened.

* * * * *